(12) United States Patent
Xu et al.

(10) Patent No.: US 11,796,493 B2
(45) Date of Patent: Oct. 24, 2023

(54) SYSTEM AND METHOD FOR IDENTIFYING LITHOLOGY BASED ON IMAGES AND XRF MINERAL INVERSION

(71) Applicant: SHANDONG UNIVERSITY, Shandong (CN)

(72) Inventors: Zhenhao Xu, Jinan (CN); Peng Lin, Jinan (CN); Guanglu Xu, Jinan (CN); Heng Shi, Jinan (CN); Tengfei Yu, Jinan (CN); Zhaoyang Wang, Jinan (CN); Yilei Hua, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/777,700

(22) PCT Filed: Dec. 30, 2020

(86) PCT No.: PCT/CN2020/141564
§ 371 (c)(1),
(2) Date: May 18, 2022

(87) PCT Pub. No.: WO2021/208515
PCT Pub. Date: Oct. 21, 2021

(65) Prior Publication Data
US 2023/0003674 A1    Jan. 5, 2023

(30) Foreign Application Priority Data

Apr. 17, 2020    (CN) .......................... 202010305833.4

(51) Int. Cl.
*G01N 23/223*    (2006.01)
(52) U.S. Cl.
CPC ..... *G01N 23/223* (2013.01); *G01N 2223/406* (2013.01); *G01N 2223/42* (2013.01)

(58) Field of Classification Search
CPC ........... G01N 23/223; G01N 2223/406; G01N 2223/42; G01N 2223/616; G01N 2223/631; G06N 3/044; E21D 9/00; G01V 5/12
See application file for complete search history.

(56) References Cited

U.S. PATENT DOCUMENTS

2007/0195645 A1    8/2007    Laake

FOREIGN PATENT DOCUMENTS

| CN | 104769422 A | 7/2015 |
|---|---|---|
| CN | 105115874 A | 12/2015 |

(Continued)

OTHER PUBLICATIONS

Apr. 2, 2021 Search Report issued in International Patent Application No. PCT/CN2020/141564.

(Continued)

*Primary Examiner* — Jurie Yun
(74) *Attorney, Agent, or Firm* — Oliff PLC

(57) ABSTRACT

A system and method for identifying lithology based on images and XRF mineral inversion solving the problem that conventional lithology identification relies on manual work, which is time-consuming, subjective and can cause misjudgment. The identification system includes an autonomous vehicle; an X ray fluorescence spectrometer probe, and tests surrounding rock element information; image collection device; and vehicle-mounted processor. The processor inverts the received surrounding rock element information into mineral information based on a Barthes-Niggli standard mineral calculation method; and receive surrounding rock images and a corresponding inclination angle thereof, convert the surrounding rock images into image information in a one-dimensional vector format, splice the image and mineral information which is in a one-dimensional format, (Continued)

and distinguish the spliced information based on a preset neural network to identify rock lithology.

10 Claims, 2 Drawing Sheets

(56) References Cited

FOREIGN PATENT DOCUMENTS

| | | |
|---|---|---|
| CN | 105221142 A | 1/2016 |
| CN | 104335032 B | 7/2017 |
| CN | 107620593 A | 1/2018 |
| CN | 109424360 A | 3/2019 |
| CN | 109710968 A | 5/2019 |
| CN | 110031491 A | 7/2019 |
| CN | 110031493 A | 7/2019 |
| CN | 110043267 A | 7/2019 |
| CN | 110346349 A | 10/2019 |
| CN | 110662961 A | 1/2020 |
| CN | 110749609 A | 2/2020 |
| CN | 111751394 A | 10/2020 |
| WO | 2018/098565 A1 | 6/2018 |

OTHER PUBLICATIONS

Apr. 2, 2021 Written Opinion of the International Searching Authority issued in International Patent Application No. PCT/CN2020/141564.

Feb. 23, 2021 Office Action and Search Report issued in Chinese Patent Application No. 202010519115.7.

SYSTEM AND METHOD FOR IDENTIFYING LITHOLOGY BASED ON IMAGES AND XRF MINERAL INVERSION

TECHNICAL FIELD

The present disclosure belongs to the field of intelligent lithology identification for tunnel surrounding rock, and particularly relates to a system and method for identifying lithology based on images and X ray fluorescence (XRF) mineral inversion.

BACKGROUND

The description in this section merely provides background information related to the present disclosure and does not necessarily constitute the prior art.

In recent years, engineers in China encounter more and more problems about tunnel construction as the infrastructure construction is rapidly developing. The tunnel construction is carried out in rock and soil mass, and such a working environment is full of high complexity and uncertainty as well as sudden disasters. Therefore, how to ensure the safety of the construction has always been a difficult problem for the engineers. It becomes more important to distinguish the lithology of surrounding rock for tunnel construction in the long-term engineering practice and exploration. A large number of engineering examples have proved that the lithology of surrounding rock and cross-section rock plays an important role in the grading of surrounding rock strength, selection of construction methods, and advanced prediction of disasters during tunnel construction. The lithology of surrounding rock even determines the cost of tunnel construction and the safety of later operation to a certain extent. Therefore, the lithology of the surrounding rock and the cross section is necessarily identified during the tunnel construction to ensure the tunnel safety and quality.

The inventors found that lithology of surrounding rock is mainly identified by manual work at present. Due to the differences in the experience and level of the staff and the existence of personal subjectivity, the results of lithology identification are often quite different, the accuracy cannot be guaranteed, and the actual needs of a project cannot be well met. Moreover, due to the tough and harsh environment of a tunnel, manually identifying the lithology by the staff is very intensive and takes a long time, and it is difficult to guarantee the efficiency.

SUMMARY

In order to solve the above problems, a first aspect of the present disclosure provides a system for identifying lithology based on images and XRF mineral inversion. The system uses a preset neural network to intelligently identify lithology of surrounding rock based on rock image information and mineral information inverted from elements, such that not only is subjective misjudgment avoided, but also the automation and intelligence of lithology identification are realized, which greatly shortens the time spent and improves the working efficiency.

XRF: X ray fluorescence.

To achieve the foregoing objective, the present disclosure adopts the following technical solutions:

A system for identifying lithology based on images and XRF mineral inversion, including an autonomous vehicle. The autonomous vehicle is provided with a probe, image collection devices and a vehicle-mounted processor.

The probe is mounted at a tail end of a mechanical arm. The mechanical arm is installed on the autonomous vehicle. The probe is an X ray fluorescence spectrometer, and is configured to test element information of surrounding rock in an area to be tested.

The image collection devices are disposed around the autonomous vehicle, and are configured to collect surrounding rock images and enable the surrounding rock images to form a closed loop.

The vehicle-mounted processor is configured to: invert the received element information of the surrounding rock in the area to be tested into mineral information based on a Barthes-Niggli standard mineral calculation method; and receive the surrounding rock images and a corresponding inclination angle of the probe, convert surrounding rock images of the same tested area into image information in a one-dimensional vector format, then splice the image information with the mineral information which is in a one-dimensional format itself, and distinguish the spliced information based on a preset neural network so as to identify rock lithology.

In order to solve the above problems, a second aspect of the present disclosure provides an identification method of a system for identifying lithology based on images and XRF mineral inversion. The method uses a preset neural network to intelligently identify lithology of surrounding rock based on rock image information and mineral information inverted from elements. Therefore, not only subjective misjudgment is avoided, but also the automation and intelligence of lithology identification are realized, which greatly shortens the time spent and improves the working efficiency.

To achieve the foregoing objective, the present disclosure adopts the following technical solutions:

An identification method of the system for identifying lithology based on images and XRF mineral inversion includes:

controlling the mechanical arm to drive the probe to the area to be tested, and testing the element information of the surrounding rock in the area to be tested by using the probe;

collecting, by the image collection devices, the surrounding rock images, and enabling the surrounding rock images to form a closed loop;

in the vehicle-mounted processor, inverting the received element information of the surrounding rock in the area to be tested into mineral information based on the Barthes-Niggli standard mineral calculation method; and converting the surrounding rock images of the same tested area into image information in the one-dimensional vector format, splicing the image information with the mineral information which is in the one-dimensional format itself, and distinguishing the spliced information based on a preset neural network so as to identify the rock lithology.

Beneficial effects of the present disclosure are:

(1) According to the present disclosure, the autonomous vehicle moves to the preset location, and the lithology of the surrounding rock is intelligently identified by using the preset neural network based on the rock image information and the mineral information inverted from the elements. Therefore, not only subjective misjudgment is avoided, but also the automation and intelligence of lithology identification are realized, which greatly shortens the time consumption and improves the work efficiency.

(2) The present disclosure replaces the conventional method of manually identifying lithology, avoids adverse effects on results due to unskilled personnel and subjective factors to the greatest extent, and improves the accuracy of lithology identification.

(3) The whole process of the present disclosure is completed using automated equipment, and no staff needs to go deep into the tunnel, which greatly improves the safety of rock identification.

BRIEF DESCRIPTION OF THE DRAWINGS

The accompanying drawings constituting a part of the present disclosure are used for providing a further understanding of the present disclosure. The schematic embodiments and description of the present disclosure are intended to explain the present disclosure, and do not constitute improper restriction to the present disclosure.

Figure 1:
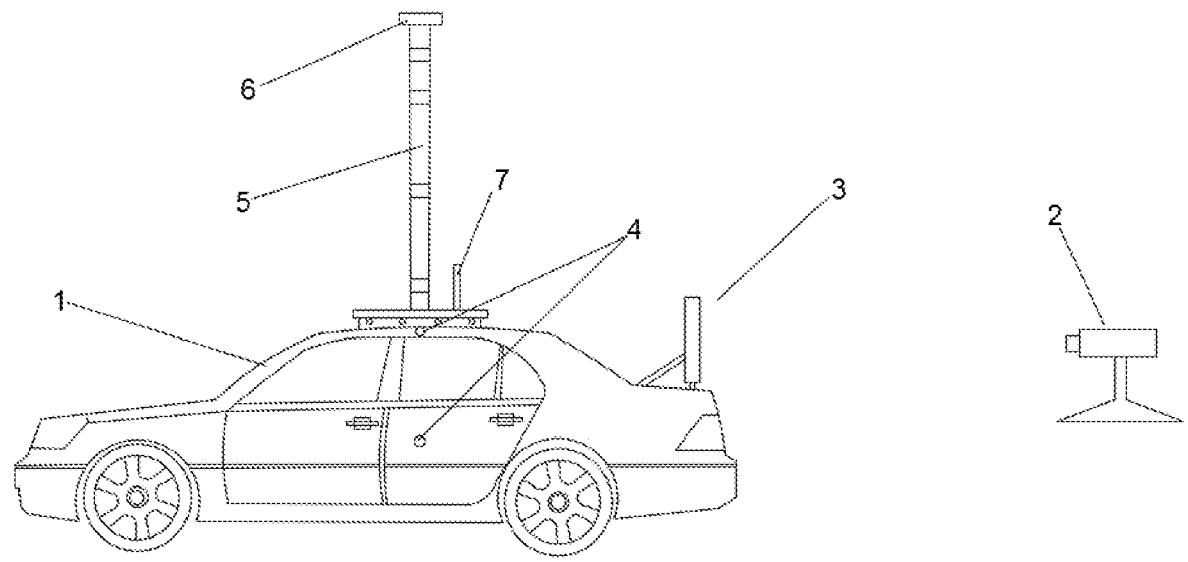
FIG. 1 is a working principle diagram of a system for identifying lithology based on images and XRF mineral inversion according to an embodiment of the present disclosure.
Figure 2:
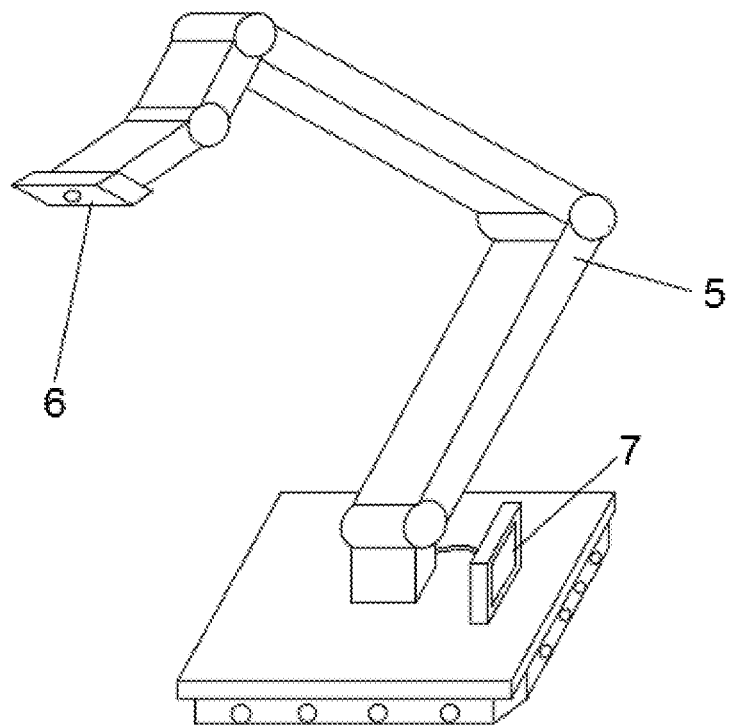
FIG. 2 is a schematic diagram of a mechanical arm and a probe according to an embodiment of the present disclosure.
Figure 3:
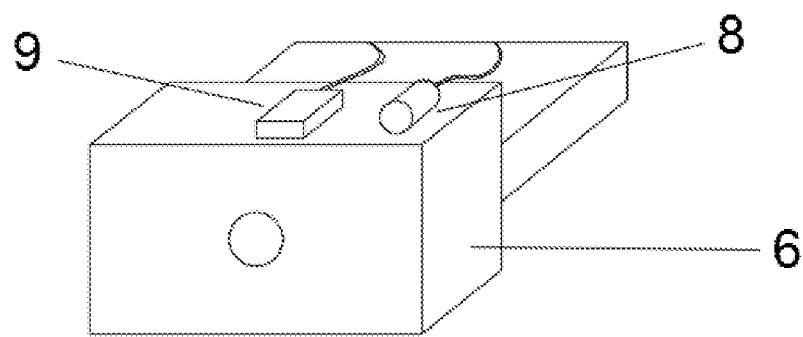
FIG. 3 is a schematic structural diagram of a probe according to an embodiment of the present disclosure.

1—Autonomous vehicle; 2—Laser transmitter; 3—Laser receiver; 4—Image collection device; 5—Mechanical arm; 6—Probe; 7—Vehicle—mounted processor; 8—Pressure sensor; and 9—Inclination angle sensor.

DETAILED DESCRIPTION

The present disclosure is further described below with reference to the accompanying drawings and embodiments.

It should be pointed out that the following detailed descriptions are all illustrative and are intended to provide further descriptions of the present disclosure. Unless otherwise specified, all technical and scientific terms used herein have the same meaning as commonly understood by a person of ordinary skill in the art to which the present disclosure belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

In the present disclosure, orientation or position relationships indicated by the terms such as "upper", "lower", "left", "right" "front", "rear", "vertical", "horizontal", "side", and "bottom" are based on orientation or position relationships shown in the accompanying drawings, and are merely relationship words that are determined for ease of describing the structural relationship between components or elements in the present disclosure, and are not intended to specifically refer to any component or element in the present disclosure. Therefore, such terms should not be construed as a limitation on the present disclosure.

In the present disclosure, terms such as "fixedly connected", "interconnection", and "connection" should be understood in a broad sense. The connection may be a fixed connection, an integral connection or a detachable connection; or the connection may be a direct connection, or an indirect connection by using an intermediary. Relevant scientific research or technical personnel in the art may determine the specific meanings of the foregoing terms in the present disclosure according to specific situations, and such terms should not be construed as a limitation on the present disclosure.

Interpretation of Terms

Flatten: refers to flattening of the output of a convolutional network. The output of the convolutional network is flattened from three dimension to one dimension, and then input into a fully connected network.

With the continuous development of various methods for tunnel construction, a method of identifying rock lithology based on manual work is obviously out of date. If the accuracy and efficiency of lithology identification cannot be improved, the potential of the overall tunnel construction may not be fully realized. At present, a method that may ensure the accuracy and efficiency of rock lithology identification is required regardless of tunnel construction or scientific research.

As shown in FIG. 1, a system for identifying lithology based on images and XRF mineral inversion according to an embodiment includes an autonomous vehicle 1. The autonomous vehicle 1 is provided with a probe 6, image collection devices 4, and a vehicle-mounted processor 7.

The probe 6 is mounted at a tail end of a mechanical arm 5. The mechanical arm 5 is installed on the autonomous vehicle 1. The probe is an X ray fluorescence spectrometer, and is configured to test element information of surrounding rock in an area to be tested.

The image collection devices 4 are disposed around the autonomous vehicle 1, and are configured to collect surrounding rock images and enable the surrounding rock images to form a closed loop.

The vehicle-mounted processor 7 is configured to: invert the received element information of the surrounding rock in the area to be tested into mineral information based on a Barthes-Niggli standard mineral calculation method; and receive the surrounding rock images and a corresponding inclination angle of the probe, convert surrounding rock images of the same tested area into image information in a one-dimensional vector format, then splice the image information with the mineral information which is in a one-dimensional format itself, distinguish the spliced information based on a preset neural network so as to identify rock lithology, and store results of rock lithology identification and the inclination angle of the probe.

Because standard minerals are expressed by the number of cations in minerals, the Barthes-Niggli standard mineral calculation method is also referred to as "cationic standard mineral method". Niggli pointed out that the main fractions in rock are silicate rock-forming minerals. The basic element of silicate is oxygen, and most of the other elements are located in the first few columns of the periodic table, which determines that there is no big difference between their atomic weights. If the molecular size of cationic standard minerals is defined as the molecular weight obtained by dividing the minerals by the number of cations, it is guaranteed that the molecular weights of main cationic standard minerals are roughly equal.

E.g:

The image collection devices 4 are implemented by cameras to perform omnidirectional imaging on surrounding rock of a tunnel, collect image information of the surrounding rock, mark angles, and store the collected image information into the vehicle-mounted processor 7.

When the autonomous vehicle 1 is running in the tunnel, the autonomous vehicle 1 moves to a preset location. The autonomous vehicle 1 is further provided with a laser receiver 3. The laser receiver 3 is configured to receive lasers emitted by a laser transmitter 2, and calculate and record a displacement distance and the location, so as to achieve positioning of the autonomous vehicle 1. The laser transmitter 2 is disposed at a tunnel entrance, and is configured to emit lasers into the tunnel.

When the autonomous vehicle 1 is running on the ground outside the tunnel, the autonomous vehicle 1 may be automatically positioned by disposing a GPS positioning module on the autonomous vehicle 1.

In a specific implementation, the mechanical arm 5 is connected with a control system. The control system is configured to control the mechanical arm 5 to drive the probe 6 to move around the autonomous vehicle 1 and reach a surface of the surrounding rock.

Specifically, the mechanical arm includes 4 mechanical arm joints. The mechanical arm 5 is controlled to rotate and move via the mechanical arm joints.

A pressure sensor 8 and an inclination angle sensor 9 are disposed inside the probe 6. The pressure sensor 8 is configured to measure pressure information between the probe and the surface of the surrounding rock, and feed the pressure information back to the control system. The inclination angle sensor 9 is configured to test an inclination angle of the probe and feed the inclination angle of the probe back to the control system.

The control system includes a controller and a memory. The controller may use a programmable logic device, a CPU, etc. The memory may use a ROM, an RAM, or an external storage device, such as a USB flash disk. The controller is configured to receive information sent by the pressure sensor and the inclination angle sensor, and control the mechanical arm 5 to move.

In a specific implementation, the vehicle-mounted processor 7 includes:

a data storage part, configured to sequentially store the surrounding rock images according to location information of the autonomous vehicle; and sequentially store element information of corresponding surrounding rock according to the location information of the autonomous vehicle and inclination angle information of the probe;

a data processing part, configured to invert the mineral information and place the surrounding rock images of the same tested area and corresponding mineral information together; and a lithology identification part, configured to identify the rock lithology.

The data processing part is further configured to perform preprocessing such as clipping and occlusion on the surrounding rock images.

The lithology identification part is configured to convert the surrounding rock images of the same tested area into the image information in the one-dimensional vector format via convolution, pooling and flattening treatment based on a B-P neural network.

The lithology identification part is further configured to splice the image information in the one-dimensional vector format with the mineral information which is in the one-dimensional format itself based on the B-P neural network, and then send the spliced rock information to a fully connected layer for distinguishing, so as to intelligently identify the rock lithology. In addition to the B-P neural network, a restricted Boltzmann machine, a support vector machine, etc. may also complete the task.

According to the embodiment, the lithology of surrounding rock is intelligently identified by using the preset neural network based on rock image information and mineral information inverted from element. Therefore, not only subjective misjudgment is avoided, but also the automation and intelligence of lithology identification are realized, which greatly shortens the time spent and improves the working efficiency.

An identification method of a system for identifying lithology based on images and XRF mineral inversion according to an embodiment includes:

controlling the mechanical arm to drive the probe to the area to be tested, and testing the element information of the surrounding rock in the area to be tested by using the probe;

collecting, by the image collection devices, the surrounding rock images, and enabling the surrounding rock images to form a closed loop;

in the vehicle-mounted processor, inverting the received element information of the surrounding rock in the area to be tested into mineral information based on the Barthes-Niggli standard mineral calculation method; and converting the surrounding rock images of the same tested area into image information in the one-dimensional vector format, splicing the image information with the mineral information which is in the one-dimensional format itself, and distinguishing the spliced information based on a preset neural network so as to identify the rock lithology, and store results of rock lithology identification and the inclination angle of the probe.

Specifically, in the process of identifying the rock lithology, the surrounding rock images of the same tested area are converted into the image information in the one-dimensional vector format via convolution, pooling and flattening treatment based on the B-P neural network. The image information is then spliced with the mineral information which is in the one-dimensional format itself. The spliced rock information is then sent to a fully connected layer for distinguishing so as to intelligently identify the rock lithology.

Specifically, the specific identification process of the system for identifying lithology based on images and XRF mineral inversion includes the following steps.

The laser transmitter is installed in the center of the tunnel entrance. The autonomous vehicle performs automatic navigation and running via cameras of the autonomous vehicle. The emitted lasers are received by the laser receiver disposed at the rear of the vehicle for automatic positioning.

After the autonomous vehicle arrives at a designated area, several cameras installed on a vehicle body perform omni-bearing imaging on surrounding rock of the tunnel, collect image information of the surrounding rock, mark angles, and store the collected image information into the vehicle-mounted processor.

The mechanical arm is extended out, and carries the probe to the inner surface of the surrounding rock at certain angles. The probe measures element information of the rock against the rock surface, such that element information of rock at several locations in the area may be obtained. The element information is numbered and saved separately according to the different inclination angles of the probe.

The vehicle-mounted processor preprocesses the images to obtain valid information, automatically inverts the element information into mineral information according to the Barthes-Niggli standard mineral calculation method, selects processed image information and mineral information, and saves information in the same area correspondingly.

The vehicle-mounted processor intelligently identifies the lithology of an area by using the image information and mineral information of the same area. The vehicle-mounted processor splices the image information which is in the one-dimensional vector format after the convolution, pooling, and flattening treatment with the mineral information which is in the one-dimensional format itself. The spliced information is distinguished based on the B-P neural network through a method of machine learning, so as to identify the rock lithology. The marked results such as coordinates and inclination angles are saved.

The autonomous vehicle moves to the next location, collects information of surrounding rock in the next area, and performs lithology identification.

The above descriptions are merely preferred embodiments of the present disclosure and are not intended to limit the present disclosure. A person skilled in the art may make various alterations and variations to the present disclosure. Any modification, equivalent replacement, or improvement made within the spirit and principle of the present disclosure shall fall within the protection scope of the present disclosure.

What is claimed is:

1. A system for identifying lithology based on images and XRF mineral inversion, comprising an autonomous vehicle, wherein the autonomous vehicle is provided with a probe, image collection devices, and a vehicle-mounted processor;
the probe is mounted at a tail end of a mechanical arm, and the mechanical arm is installed on the autonomous vehicle; the probe is an X ray fluorescence spectrometer, and is configured to test element information of surrounding rock in an area to be tested;
the image collection devices are disposed around the autonomous vehicle, and are configured to collect surrounding rock images and enable the surrounding rock images to form a closed loop; and
the vehicle-mounted processor is configured to: invert the received element information of the surrounding rock in the area to be tested into mineral information based on a Barthes-Niggli standard mineral calculation method; and
receive the surrounding rock images and a corresponding inclination angle of the probe, convert surrounding rock images of the same tested area into image information in a one-dimensional vector format, then splice the image information with the mineral information which is in a one-dimensional format itself, and distinguish the spliced information based on a preset neural network so as to identify rock lithology.

2. The system for identifying lithology based on images and XRF mineral inversion according to claim 1, wherein the autonomous vehicle is further provided with a laser receiver, and the laser receiver is configured to receive lasers emitted by a laser transmitter, and calculate and record a displacement distance and a location; and the laser transmitter is disposed at a tunnel entrance, and is configured to emit lasers into a tunnel.

3. The system for identifying lithology based on images and XRF mineral inversion according to claim 1, wherein the mechanical arm is connected with a control system, and the control system is configured to control the mechanical arm to drive the probe to move around the autonomous vehicle and reach a surface of the surrounding rock.

4. The system for identifying lithology based on images and XRF mineral inversion according to claim 3, wherein a pressure sensor and an inclination angle sensor are disposed inside the probe, the pressure sensor is configured to measure pressure information between the probe and the surface of the surrounding rock, and feed the pressure information back to the control system, and the inclination angle sensor is configured to test an inclination angle of the probe and feed the inclination angle of the probe back to the control system.

5. The system for identifying lithology based on images and XRF mineral inversion according to claim 1, wherein the vehicle-mounted processor comprises: a data storage part, configured to sequentially store the surrounding rock images according to location information of the autonomous vehicle; and sequentially store element information of corresponding surrounding rock according to the location information of the autonomous vehicle and inclination angle information of the probe;
a data processing part, configured to invert the mineral information and place the surrounding rock images of the same tested area and corresponding mineral information together; and
a lithology identification part, configured to identify the rock lithology.

6. The system for identifying lithology based on images and XRF mineral inversion according to claim 5, wherein the data processing part is further configured to perform preprocessing such as clipping and occlusion on the surrounding rock images.

7. The system for identifying lithology based on images and XRF mineral inversion according to claim 5, wherein the lithology identification part is configured to convert the surrounding rock images of the same tested area into the image information in the one-dimensional vector format via convolution, pooling and flattening treatment based on a B-P neural network.

8. The system for identifying lithology based on images and XRF mineral inversion according to claim 7, wherein the lithology identification part is further configured to splice the image information in the one-dimensional vector format with the mineral information which is in the one-dimensional format itself based on the B-P neural network, and then send the spliced rock information to a fully connected layer for distinguishing, so as to intelligently identify the rock lithology.

9. An identification method of the system for identifying lithology based on images and XRF mineral inversion according to claim 8, comprising:
moving the autonomous vehicle to the area to be tested;
controlling the mechanical arm to drive the probe to the area to be tested, and testing the element information of the surrounding rock in the area to be tested by using the probe;
collecting, by the image collection devices, the surrounding rock images, and enabling the surrounding rock images to form the closed loop;
in the vehicle-mounted processor, inverting the received element information of the surrounding rock in the area to be tested into mineral information based on the Barthes-Niggli standard mineral calculation method; and converting the surrounding rock images of the same tested area into image information in the one-dimensional vector format, splicing the image information with the mineral information which is in the one-dimensional format itself, and distinguishing the spliced information based on a preset neural network so as to identify the rock lithology.

10. The identification method according to claim 9, wherein in the process of identifying the rock lithology, the surrounding rock images of the same tested area are converted into the image information in the one-dimensional vector format via convolution, pooling and flattening treatment based on the B-P neural network, then the image information is spliced with the mineral information which is in the one-dimensional format itself, and then the spliced rock information is sent to the fully connected layer for distinguishing, so as to intelligently identify the rock lithology.

* * * * *